Oct. 7, 1969 R. S. PENLAND 3,471,773
METAL DETECTING DEVICE WITH INDUCTIVELY COUPLED
COAXIAL TRANSMITTER AND RECEIVER COILS
Filed Dec. 20, 1967 2 Sheets-Sheet 2
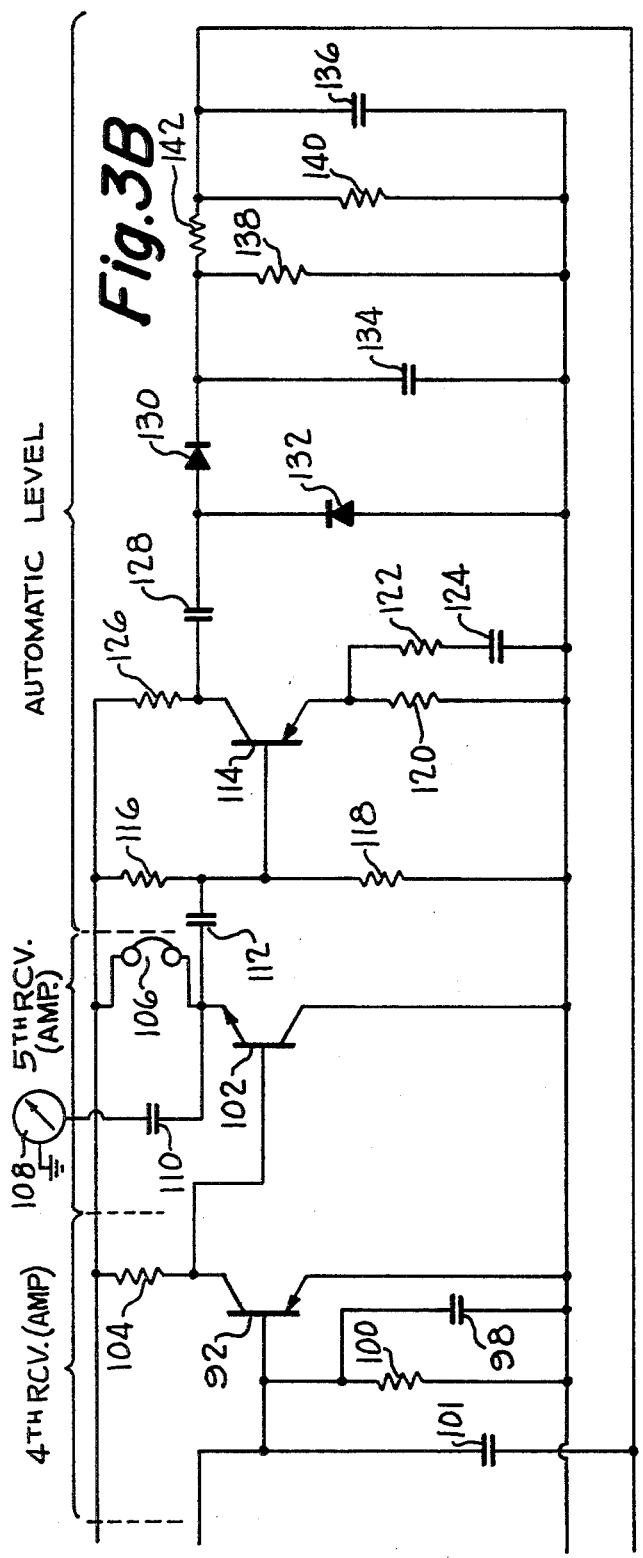
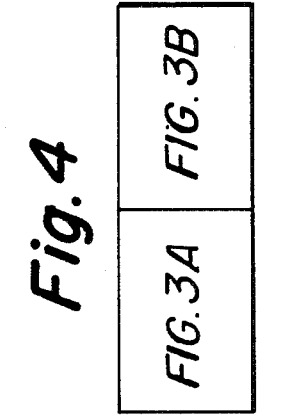
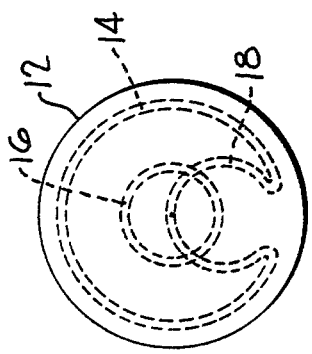
INVENTOR
ROBERT S. PENLAND
BY Arthur A Jacobs
ATTORNEY United States Patent Office 3,471,773
Patented Oct. 7, 1969

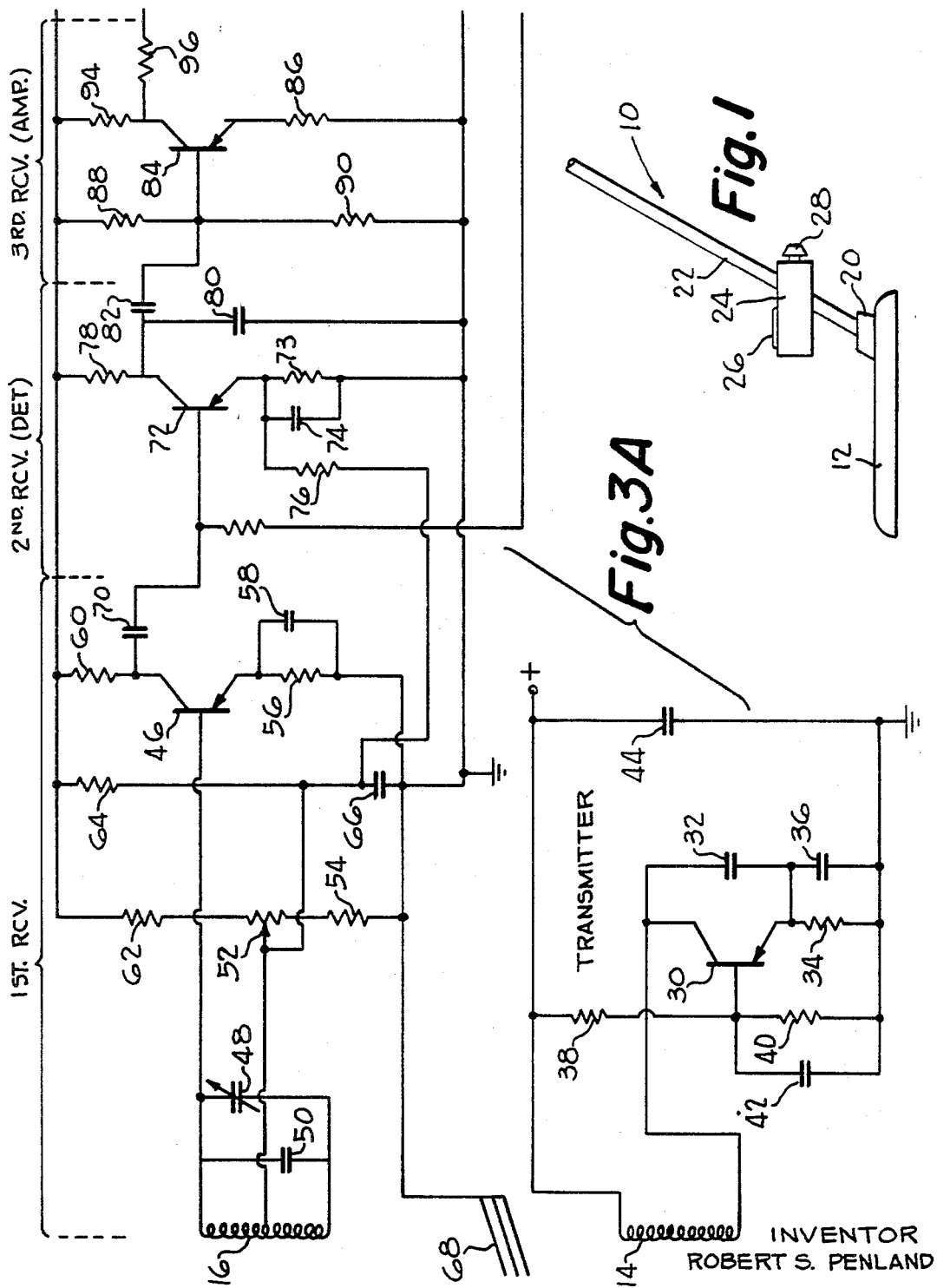

3,471,773
METAL DETECTING DEVICE WITH INDUCTIVELY COUPLED COAXIAL TRANSMITTER AND RECEIVER COILS
Robert S. Penland, Northfield, N.J., assignor to Electronic Sensing Products, Inc., Atlantic City, N.J., a corporation of New Jersey
Filed Dec. 20, 1967, Ser. No. 692,205
Int. Cl. G01v 3/00
U.S. Cl. 324—3                                6 Claims

ABSTRACT OF THE DISCLOSURE

A metal detecting device including a detector head and a handle or the like for moving the head over a surface on or underneath which a metal object may lie. The head, which is, preferably, waterproof, contains a transmitter coil and a receiver coil, said coils being so disposed relative to each other that the receiver coil receives an induced signal which is just sufficient to trigger the receiver circuit. The receiver coil is so constructed that when metal is placed in the axis thereof, the signal amplitude increases because of the decrease of inductance of the receiver coil, thereby increasing the receiver output. An electrical network comprising a detector circuit which includes detector and amplifying units, and a leveller circuit to level the received signal to compensate for variations in signal conditions, is connected to the receiver coil. The head is also, preferably, provided with an electrostatic shield to cancel the effects of varying capacitances of surfaces being searched and of electrically charged materials on such surfaces.

---

This invention relates to an electronic detector device, and it particularly relates to a device for detecting the presence of both ferrous and nonferrous metals buried under earth, mud, concrete, water or the like.

The device may be made of any desired size and may consist of either one or a number of individual units. The type described herein comprises a hand-held mechanism constituted by a single unit.

The detector embodying the present invention is adapted to operate on battery current and the hand-held detector described herein may operate on one 9 volt transistor battery. It includes a transmitter unit and a receiver unit. The transmitter sends out an overmodulated CW signal at 100 kHz. and the receiving coil is physically positioned so that it nulls out this signal. When a metal object is introduced into the vicinity of the receiving coil, the inductance of the receiving coil changes, causing a change in signal. This change is received and detected, and an increase of 1 microvolt per millivolt input will be picked up.

The RF component of the received signal is filtered so that only the amount over an adjustable threshold is saved. The filter contains a feedback network that disregards any slow changes in the signal such as might occur from drift in the circuit. Only changes that occur within a predetermined time will be read as a voltage change. For example, when the device is being used to detect small objects, only changes that occur within a small time interval, e.g., 0.5–5.0 seconds, the usual time to sweep a small object, will be read as a voltage change.

If the detector sweeps over a metal object, the circuit is driven to maximum output, overcoming the sensitivity control circuit and producing a loud ringing in the headphones or other sound-transmitting device. A long, thin bar produces a reduction in indication, while an equisided metallic object produces an increase in output.

After passing the filter, the signal is amplified and then pulse width is modulated to square any given input voltage. The output of the cascade circuit is read on a meter and heard in a headphone, or the like, for an audible indication of value.

In the underwater unit, the coils, meter and solid-state circuitry are preferably packaged in a polyester case shrunk over polyvinylchloride fittings. Connections to these fittings are also preferably made of polyvinylchloride and are held to the fittings by epoxy glue. The land model, which may operate even in shallow water, e.g., up to about 18 inches of water, is preferably packaged in urethane foam coated with a fiber glass reinforced polyester resin. The outer coating preferably comprises a polyester gel.

An electrostatic shield is provided to cancel the effects of varying capacitance of surfaces being searched and of the effects of electrically charged weeds and salt water. This shield preferably consists of parallel #20 wires placed about one-half inch apart on the bottom of the head, directly below the receiver coil, and is connected to ground through the circuit. These wires are effectively embedded in the bottom surface during final head molding.

The above-described device has a great sensitivity, regardless of the type of surface (water, soil, etc.) that is superimposed over the metal object, and is, furthermore, sensitive to both ferrous and nonferrous metals. This is a great advantage over prior art devices which were generally far less sensitive and were, in many instances, utilizable only for ferrous objects. The provision of this increased sensitivity, regardless of superimposed surface, and capability of detecting all types of metals, is the primary object of the present invention.

Another object of the present invention is the provision of a detector device, of the aforesaid type, that is simple in construction, relatively inexpensive to manufacture, and easy to use.

Other objects and many of the attendant advantages of this invention will be readily appreciated as the same becomes better understood by reference to the following description when read in conjunction with the accompanying drawings wherein:

FIG. 1 is a side elevational view of a detector device embodying the present invention.

FIG. 2 is a bottom view of the head portion of the detector device of FIG. 1, showing the transmitter and receiver coils in dotted outline, these coils being molded within the head.

FIGS. 3A and 3B are schematic views showing two portions of the same network, FIG. 3B being a continuation of 3A and the transmitter circuit being part of the complete network.

FIG. 4 is a diagrammatic view showing how the portions of the network shown in FIGS. 3A and 3B are connected.

Referring now in greater detail to the various figures of the drawings wherein similar reference characters refer to similar parts, there is shown in FIG. 1 a hand-operated type of detector, generally designated 10, having a head 12 in which are located the transmitter coil 14 and the receiver coil 16. The transmitter coil 12, which is generally coaxial with and positioned outwardly of the receiver coil 16 (as best shown in FIG. 2), has one portion thereof bent to form an inner loop, as shown at 18. This inner loop 18 partially overlaps the plane of the circular receiver coil 16 but is axially spaced therefrom, the coil 16 being below the loop 18. The positioning of the coils is important because the receiver coil 16 is positioned to center the bias control of the first receive stage of the network in such manner that the output is very low when the detector device is either within the vicinity of metal not desired to be detected or in the presence of objects other than metal. Insofar as concerns metals not desired to be detected, the device can be so constructed that it will respond only to certain metals.

Mounted on the head is a base member 20 (as best seen in FIG. 1) from which extends a hollow handle 22. The handle 22 is shown as being straight, but it may be curved or of any other desired configuration. It may also be made of separate coupled sections, when desired. Mounted on and intersecting the handle 22 is a housing 24 of polyester or the like, and which is preferably waterproof. The housing 24 encloses the circuitry illustrated in FIGS. 3A and 3B, the connections between the coils 14 and 16 in the head 12 and the circuitry passing through the hollow handle 22.

The housing supports a meter 26 which is open to view through a water-proof, transparent cover, and a knob 28 which is operatively connected to a potentiometer within the housing.

The electrical network for operating the device is illustrated in FIGS. 3A and 3B and includes the transmitter coil 14 and the receiver coil 16. The transmitter output frequency is usually set to approximately 100 hertz kH. amplitude modulated at approximately 500 hertz. By utilizing a very low length to diameter ratio and a folded figure 8 coil configuration on the transmitter coil 14, the signal is very low and the oscillator goes into and out of oscillation at a predetermined audio rate.

The transmitter coil 14 is directly connected to the collector of transmitter 30 and to the emitter thereof through a coupling capacitor 32. The on-off oscillations are further enhanced by fixed emitter bias resistor 34 and capacitor 36 together with very high base bias resistors 38 and 40. A base to emitter return capacitor 42 provides for control of the AM modulation. A capacitor 44 is provided between the source of energy and ground.

The receiver coil 16 is tuned to the transmitter frequency and is placed below the transmitter coil on one sid of the null. Placement is important since the receiver coil is positioned to center the bias control of the first receiver stage such that output is very low when the detector is either within the vicinity of metal not desired to be detected or in the presence of objects not made of metal.

The transistor 30 is biased for conduction in such manner that only the tops of the modulated RF envelope is coupled to the first receiver stage. The first receiver stage is biased so that a relatively narrow negative, rectified signal is coupled to the second receiver stage.

One end of the receiver coil 16 is directly connected to the base of first receiver stage transistor 46. Coil 16, in conjunction with variable capacitor 48 and capacitor 50, form a parallel tuned circuit, with center tap ground return.

A potentiometer 52, which provides sensitivity and level control, connects the receiver coil 16, through resistor 54, to the emitter of the transistor 46. Bias control on the emitter is provided by resistor 56 and capacitor 58. Resistor 60 serves as the collector load resistor, and bias control for the transistor 46 is through resistors 62 and 64. The potentiometer is connected to ground through capacitor 66 biased by resistor 64. An electrostatic shield 68, as described above, is connected to ground through the circuit.

The collector of transistor 46 is coupled by capacitor 70 to the base of the second stage receiver transistor 72. This transistor 72 serves as a further rectifier, automatic leveller detector stage. It is biased near cutoff by resistor 73 and capacitor 74 in the emitter circuit which is provided with a resistor 76. The resistor 76 serves as a bias in the feedback circuit for biasing the first stage. Resistor 78 serves as a collector load for transistor 72.

The radio frequency components of the signal are removed by capacitor 80 from the collector to the emitter return (ground) circuit. Differentiation or peaking is further accomplished by a small value of coupling capacitor 82 which couples the collector of transistor 72 to the base of transistor 84. The transistor 84 serves as the third receiver or conducting amplifier stage, with degeneration provided in the emitter by resistor 86. Base bias resistors 88 and 90 enhance the oscillations.

Transistor 84 is coupled to the fourth receiver or amplifier stage resistor 92 (see FIG. 3B) by an integrating circuit from the collector of transistor 84, with resistor 94 acting as a load. Resistor 96 and capacitor 98 form the integrating circuit. Resistor 100 acts as a base bias for the transistor 92. Capacitor 101 acts as a coupler in the feedback circuit. The purpose of this circuit is to slightly equalize the pulse tops to prevent sporadic output, but without impairing the sensitivity. This stage serves as an amplifier and provides additional sharp cutoff triggering with low hysteresis.

The transistor 92 is connected to the base of the fifth receiver or amplifier stage transistor 102 through the collector circuit biased by a resistor 104. The transistor 102 serves as an inverter, emitter follower output stage which drives an AC coupled bridge rectifier, a microampere meter indicator and/or headphones, as well as an AC coupled leveller circuit. In this respect, the emitter of transistor 102 drives headphone 106, as well as microammeter 108 through coupler capacitor 110, and is AC coupled through capacitor 112 to transistor 114. Resistors 116 and 118 provide a base bias for transistor 114.

The collector of transistor 102 is connected to the emitter of a final stage transistor 116 whose base is biased by a resistor 118. The emitter of transistor 116 is biased by a resistor 120 in parallel with a resistor 122 and capacitor 124. The collector of transistor 116 is provided with a load resistor 126 and is coupled through capacitor 128 to a circuit which includes rectifiers 130 and 132 and capacitors 134 and 136 in parallel with resistors 138 and 140 which are, in turn, connected through resistor 142.

This final stage, which consists of an amplifier rectifier/voltage doubler, filter and delay circuit, serves as a signal leveller to compensate for variations in signal conditions due to component and temperautre changes. It maintains the detector at the most sensitive level after the potentiometer 52 has been set by he operator of the device.

Obviously, many modifications of the present invention are possible in the light of the above teachings. It is, therefore, to be understood that within the scope of the appended claims, the invention may be practiced otherwise than as specifically described.

The invention claimed is:
1. A metal detecting device comprising a detector head, an annular transmitter coil and an annular receiver coil in said head, said transmitter coil being coaxial with said receiver coil and positioned radially outward thereof throughout the major extent of the transmitter coil, said transmitter coil having a minor annular loop section which extends radially inward, an arcuate portion of said loop section overlapping an arcuate portion of said receiver coil, the remainder of said receiver coil being in non-overlapped position relative to said loop section, said transmitter coil being inductively coupled directly to said receiver coil to induce a direct signal into said receiver coil which is just sufficient to trigger the receiver circuit, said receiver coil being so constructed that when a metal object is placed in the axis thereof the signal amplitude increases due to decrease of the inductance of the receiver coil, thereby increasing the receiver output, an electrical network having its input connected to said receiver coil, said network comprising a detector circuit including amplifying means, said detector circuit being connected to a detection means to detect the increase of signal amplitude, and a leveller circuit, including a fixed time delay resistor and a feedback network, coupled from the detection means to the input of the electrical network to provide a predetermined bias in said detector circuit.

2. The device of claim 1 wherein the detector head is provided with an electrostatic shield in operative relationship to said receiver coil.

3. The device of claim 1 wherein said network includes a potentiometer in electrical circuit between the receiver coil and the detector circuit for varying the sensitivity and level control of the device.

4. The device of claim 1 wherein the detector circuit comprises a first receiver stage, a second receiver stage, and a plurality of amplifier stages, each stage including a transistor in circuit with the next succeeding stage.

5. The device of claim 1 wherein said head and said network are enclosed in waterproof housing means.

6. The device of claim 1 wherein said network is operatively and selectively connected to an auditory receiver means and an amperage meter.

References Cited

UNITED STATES PATENTS

| | | |
|---|---|---|
| 2,451,596 | 10/1948 | Wheeler _____ 324—3 |
| 2,066,135 | 12/1936 | Barret et al. _____ 324—3 |
| 2,066,561 | 1/1937 | Fisher _____ 324—3 |
| 2,129,058 | 9/1938 | Hedden _____ 324—3 XR |
| 2,160,356 | 5/1939 | Fore et al. _____ 324—3 |
| 2,201,256 | 5/1940 | Barret _____ 324—3 |
| 2,681,434 | 6/1954 | Wheeler _____ 324—3 |
| 3,020,470 | 2/1962 | Shawhan et al. _____ 324—3 |
| 3,309,690 | 3/1967 | Moffitt _____ 324—67 XR |

OTHER REFERENCES

Osborne, W. E. Transistorized Metal Detector, Electronics World, pp. 86–88, March 1962.

GERHARD R. STRECKER, Primary Examiner